United States Patent Office 3,359,294
Patented Dec. 19, 1967

3,359,294
REACTION PRODUCT OF TETRAFLUORO-
ETHYLENE TELOMER AND POLYETHYL
SILICATE
Elemer Domba, Chicago, Ill., assignor to Nalco Chemical
Company, Chicago, Ill., a corporation of Delaware
No Drawing. Filed Jan. 14, 1964, Ser. No. 337,536
4 Claims. (Cl. 260—448.8)

This invention is concerned with new compositions and their use in inhibiting and preventing foaming problems. More particularly, the instant invention relates to fluorosilicate polymeric compositions, particularly valuable in inhibiting and preventing foaming of aqueous industrial processes.

It is known that many industrial systems are particularly susceptible to foaming problems even under mild conditions of agitation. In their more serious aspects these problems become a substantial drawback in not allowing full utilization of the particular equipment involved. Also, in many instances operating conditions are so altered by foam that considerable interference with the process itself is caused, with resultant low capacity and considerable economic loss. Serious foaming sometimes occurs, for example, when solvents or unreacted starting materials are stripped off either in vacuo or under atmospheric conditions, leaving behind the desired industrial product. For example, foaming of a considerable magnitude occurs when organic solvents used in preparing aqueous latex emulsions and/or unreacted monomer are removed by heat distillation, vacuum flashing, steam stripping or through other concentration techniques. Similarly, uncontrolled foaming at various steps in a paper-making process can cause considerable difficulties.

In order to counteract foaming problems of the type discussed above and others, it is oftentimes necessary to resort to chemical treatment to both abate the existing foam and prevent its reoccurrence.

However, many of the chemical treatments are limited in their application insofar as only one of the aforementioned effects takes place. That is, either immediate foam abatement occurs but without continuing foam prevention, or a treatment will provide continuous foam protection but is of no great use in dissipating already formed foam. Therefore, in many instances it is necessary to resort to at least two or more specific chemicals acting as adminicles to one another in order to achieve both foam abatement and foam inhibition in a system under treatment. However, this resort to multi-component treatment in order to achieve the required scope of activity often leads to further problems such as dispersibility of the compounds both in each other and in the particular system to be controlled. In addition, costly time and manpower must be spent in compounding these multi-component antifoam treating compositions.

Another serious disadvantage of prior art compositions is their inability to be applied generally in a wide variety of industrial systems and processes. For example, organo-silicone condensation products or linear organo-polysiloxanes, such as silicone and silicate polymers, while possessing good foam depressant or antifoam activity in certain media are relatively less active in other environments such as in aqueous foamable systems. Also, the above compositions and particularly silicones are costly, and often economics dictate use of certain other substances.

Many other disadvantages are involved in the use of prior art antifoam treatments. Some of the substances break down chemically and physically. These products of degradation may debilitate the parent active component or cause foaming problems due to their own foam encouraging properties.

Other antifoam compositions cannot be employed in certain areas due to the fact that they are quickly adduced from the area which needs control such as by heat distillation, or have little or no dispersibility, much less permanent dispersibility in the medium to be treated.

Lastly, many defoaming or foam-inhibiting substances must be employed in relatively large amounts to give effective control, or else cause difficult process control problems because they are ineffective unless added within certain critical limits.

It would, therefore, be a beneficial advance in the antifoaming art if a single substance could be found which is relatively general in its application, has good chemical and physical stability, excellent dispersibility or solubility in the environment to be treated, and yet need only be applied in relatively low amounts to give effective control. It would be an extreme advantage to the art if an antifoam substance could be discovered which may be usefully employed, particularly in troublesome aqueous systems which have a strong tendency to foam, such as aqueous latex emulsions and in various aqueous systems such as those used in processing paper pulp and the like.

It therefore becomes an object of the invention to provide stable, easily dispersible antifoam compounds which have rather general application without recourse to other antifoam aids.

Another object of the invention is to provide novel compositions of matter which may be used to simultaneously defoam and inhibit foam in widely variable processes.

A specific object of the invention is to provide compounds which may be used in aqueous systems particularly susceptible to foaming problems such as aqueous latex emulsions, paper pulp streams, etc.

Other objects will appear hereinafter.

In accordance with the invention, a novel class of compounds has been discovered which is admirably suited for use in defoaming and foam inhibition activities. These new compounds may be used as antifoam agents without resort to combination with other ingredients and may be used in a wide variety of industrial processes which are accompanied by foaming problems. In general, these antifoamers are polymeric products derived from the reaction of a tetrafluoroethylene telomer having an average molecular weight of at least approximately 500 and a polyethyl silicate. These fluoro-silicate polymeric compositions find use both as defoaming agents, that is, in abating a system already in a foaming state or in inhibiting or preventing foam formation before such a condition occurs. Both roles may, of course, be performed simultaneously.

The first reactant used in forming the antifoam compositions of the invention is a relatively low molecular weight tetrafluoroethylene telomer. These materials have an average molecular weight of at least 500, and may range as high as 30,000. Polymers of this type having a substantially higher average molecular weight figure than this latter figure, when used as reactants with polyethyl silicate, do not give final products which have good antifoaming activity, at least, relative to those materials formed via the lower molecular weight tetrafluoroethylene telomers. Most preferably, the telomeric tetrafluoroethylene reactants have an average molecular weight range of 1,000–10,000.

The above low molecular weight polymers are generally solid, waxy substances which have particle sizes generally in excess of one micron, and more often between 1 and 10 microns. When employed as reactants in the instant invention, it is preferred that they be mixed initially with the polyethyl silicate material while in solution or dispersion form. Thus, the tetrafluoroethylene telomers may be spended prior to reaction in a variety of solvents at oncentrations which range in general from about 1 to out 30% by weight. It is more desirable to employ -25% by weight of solids of tetrafluoroethylene telomer various solvents.

The fluoro polymers are soluble or dispersible to a reater or lesser degree depending upon the nature and mount of the solvent employed. Such solvents as toluene, enzene, acetone, aliphatic hydrocarbons, etc., may be mployed with some success, and particularly when only mall amounts of fluoro polymer are to be solubilized or ispersed therein. It is greatly preferred that the tetra- uoroethylene telomer be added to a halogenated hydro- arbon such as perchloroethylene, trichloroethylene, tri- hlorofluoromethane, dichlorodifluoromethane, chlorotri- luoromethane, chlorodifluoromethane, 1,1-2-trichloro-1, ,2-trifluoroethane, sym-dichlorotetrafluoroethane, etc. The polymeric fluoro reactants may also be dispersed orior to reaction, in mixtures of the above or in one or nore of the above halogenated hydrocarbons in further combination with more conventional solvents such as n- reptane, toluene, benzene, etc.

One excellent source of tetrafluoroethylene telomers are those commercially available under the trademark 'Vydax." These are generally sold in form of dispersions or suspensions of the polymer in one or more of the above listed halogenated lower molecular weight hydro- carbons. Generally, these suspensions contain 5–25% by weight of fluoro polymer, a portion of which is actually solubilized, with the remainder existing as a fairly stable dispersion. Excellent tetrafluoroethylene telomer sources which have found use in the instant invention are avail- able as "Vydax" AR, "Vydax" BR, and "Vydax" 1000.

Table I below gives physical and chemical data of a typical tetrafluoroethylene telomer which may be usefully employed as a reactant. The fluoro polymer was dispersed as a 20% by weight suspension in trichlorotrifluoroethane. This particular solvent distills at approximately 48° C., and is therefore easily and quickly removed by distilla- tion prior to any reaction taking place between the fluoro polymer and polyethyl silicate compound.

*Table I*

| Appearance | White translucent fluid. |
|---|---|
| Solids | 20%. |
| Particle Size | 5 microns, approximately. |
| Viscosity (Brookfield–25° C.) | 1,600 cps. (at 20 r.p.m.). |
| Density 25° C. | 1.65 gms./ml. |

Telomer Solids Data:

| Density | 2.16 gms./ml. |
|---|---|
| Softening Point (ASTM E-28-58T) | 510° F. (265° C.). |
| Melting Point (Crystalline) | 572° F. (300° C.). |
| Hardness (ASTM D-1321-57T) (Penetrometer needle penetration 25° C., 5 secs. 400 gm. weight) | 0.5 mm. |
| Molecular weight | 3000, approximately. |

The other reactant used in forming the antifoam com- positions of the invention is a polyethyl silicate. Preferred materials are those having an average molecular weight ranging from 300 to 2000 and more preferably from 400 to 1500. These poly-silicate materials are generally de- rived from controlled hydrolysis of silicon tetrahalides and particularly silicon tetrachloride in aqueous-ethanolic solutions. A mixture of polymeric materials is formed, but the predominant species has the following general formula:

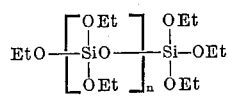

wherein $n$ is an integer ranging from about 4 to about 15 and Et represents the $C_2H_5$ group. In addition other lower molecular weight polysiloxanes may be present which may be termed, for convenience, hydrolyzate condensa- tion products of the starting silicon tetrahalide reactants. These hydrolyzate condensation products generally con- tain terminal hydroxyl groups. More preferred polyethyl silicate mixtures therefore have at least 1% of their molec- ular weight composed of free reactive hydroxyl groups and most preferably at least 2%. A typical ethyl silicate polymer has 2–3 of its molecular weight composed of hydroxyls. These reactive hydroxyls are believed to pro- mote reaction between the low molecular weight tetra- fluoroethylene telomers and polyethyl silicate reactants whereby relatively high molecular weight final products are achieved which possess excellent antifoam activity.

Likewise, these above polysilicate materials may be defined solely in terms of their available silica con- tent expressed as $SiO_2$. In materials of this type, as the extent of polymerization increases, silica content, ex- prressed as $SiO_2$ likewise proportionally increases. Pre- ferred polyethyl silicates have an available silica con- tent, expressed as $SiO_2$, ranging from 35% by weight of the overall molecule weight to about 55% by weight. More preferred materials have $SiO_2$ contents within a range of 35–45%. Most preferably, the $SiO_2$ content of the polyethyl silicate reactant ranges from about 38% to about 42% by weight. As a comparison a pure mon- omeric tetraortho silicate ester has a silica content ($SiO_2$) of approximately 28% by weight. Thus, by the term "polyethyl silicate" is meant a composition mixture char- acterized by the above distinguishing physical and chemi- cal properties which is usually formed by controlled ethanolic hydrolysis of silicon tetrahalide or similar monomeric derivatives.

A preferred starting polyethyl silicate reactant which has been found to be extremely valuable in preparing antifoam compositions of the invention is sold under the trademark "Ethyl Silicate 40." This compound is a mix- ture of ethylpolysilicates having about 40% available silica expressed as $SiO_2$ and is synthesized from the con- trolled hydrolysis of tetraethylorthosilicate or tetrachloro- silicon. This polyethyl silicate is generally described as a mixed polymer of ethyl silicate with an average of 5 silicon atoms per molecule.

One specific source of this material has a specific gravity at 20° C. of 1.0558, a freezing point of —90° C., a viscosity at 20° C. of 3.9 cps. and a refractive index of 20° C. of 1.3965. This particular polymeric substance was derived from the controlled hydrolysis of silicon tetrachloride in 95% ethanol and 5% water.

The antifoam compositions of the invention are pre- pared by simply mixing and heating together under con- ditions of agitation the above described tetrafluoroethyl- ene telomer and polyethyl silicate reactants at tempera- tures from 100–300° C., and more preferably from about 120° C. to about 250° C. The time of heating may be varied over a wide range, but preferably is carried out from about 2 to about 20 hours. More preferred prod- ucts are prepared by heating from 4 to about 15 hours at temperatures from about 140° C., to about 200° C. Vacuum may also be employed during the heating step, to measured levels as low as 5 mm. of mercury. How- ever, the reaction may be run at atmospheric pressure with equal facility, and use of vacuum merely tends to speed up the reaction. In one typical series of runs the two reactants were heated at pot temperatures ranging from 140° to 200° C., over a period of 6–14 hours under reduced pressures ranging from 10 to 50 mm. of mercury.

The solvent carrier for the fluoro polymer is generally driven off by distillation before any reaction takes place. Such solvents are present initially merely to effect good mixing and agitation between the silicate and fluoro polymer reactants.

The proportions of the two reactants used in forming the final products of the invention may be varied over wide ranges. Typical products are formed by reacting 1–20 parts by weight of polyethyl silicate with one part of tetrafluoroethylene telomer. More preferably, 5–15 parts of silicate are mixed and subsequently reacted with one part of the fluoro polymer.

The exact molecular structures of the final reaction products cannot be set forth due to their complexity and variable structural make-up. It is known, however, that further polymerization of the two reactants takes place whereby some type of a copolymeric substance is produced. Particularly, as mentioned above, since the lower molecular weight silicate polymers have free reactive hydroxyl groups, molecular reactivity with the tetrafluoroethylene telomers is strongly induced. It is also believed that a free radical type of reaction takes place which is particularly promoted by a few built-in peroxide groups present in the fluoro polymers as well as presence of methylene groups, which are easily formed into free radical groups. Likewise, the end group stoppers of the fluoro polymer are stripped off during the reaction leaving a reactive free radical polymeric chain which may condense with the polyethyl silicate material.

Also during the reaction itself, ethanol as well as low boiling silicate fractions are removed. This indicates occurrence of some type of condensation reaction. Proof of reality of some type of reaction is further shown by the fact that the individual reactants show little, if any, antifoam activity even after heated within the above stated temperature range. Yet, when the two reactants are heated together by generally following the above suggested process procedures, products having excellent antifoam characteristic are realized.

After the reaction is completed, the final product then is a 100% active, slightly viscous liquid free of inactive recrement or diluents, which may be directly employed as an antifoam in various industrial processes.

The following example states a typical mode of preparation of a regular antifoam composition of the invention.

EXAMPLE I

A reactor was charged with 100 pounds of "Vydax" AR tetrafluoroethylene telomer (5 micron particle size polymer present as a 20% suspension in trichlorotrifluoroethane) and 300 pounds of "Ethyl Silicate 40." After thorough mixing of the ingredients, heating was initiated while stirring continued. The halogenated hydrocarbon distilled over at approximately 40–50° C. Heating was further continued and at about 80° C., it was noted that ethanol was beginning to distill over. Further reaction was effected over a period of approximately six hours time at temperatures ranging from 100° C., to about 140° C. The temperature was gradually raised over this period of time to insure constant flow of distillate comprising primarily alcohol. When no more distillate was noted, vacuum was applied (100–200 mm. mercury) and the mixture further heated at 140°–145° C. This temperature was maintained until distillation ceased. At this point the reaction was considered complete and the batch was cooled and drummed. The product was available for immediate use, and excellent antifoam activity could be realized without further incorporation into solvents or without further modification of any type.

While equally good foam inhibiting and preventing activity may be realized via use of the reaction products of the invention as such, they may also be further compounded with various substances. For example, if desired, the reaction products may be dispersed in aliphatic hydrocarbon oils such as mineral seal oil, kerosene, various light aliphatic fuel oils, gas oils, paraffin waxes, low molecular weight polyethylene, chlorinated paraffins, etc. Likewise, various additives may be used when the active antifoamers are compounded in one or more of the above vehicles or others. For example, zinc stearate, aluminum stearate, or other materials may be used to increase the viscosity of the solvent formulations whereby the active ingredient is maintained in a homogeneously dispersed condition over long periods of time, and settling is substantially avoided.

In many instances emulsifying agents, such as polyoxyethylene glycols and polyalkylene glycols of the types marketed under the trade names of "Ucon" and "Carbowax," may be added to the reaction products of the invention or to their formulations. Compounds other than emulsifiers and extenders, such as dispersants and the like, may also be added to the reaction products of the invention in order to obtain formulated products of the desired physical characteristics in order to overcome feeding problems, etc.

The fluoro-silicate polymeric products are useful in a wide variety of industrial processes which require control of foaming problems. Among these processes, the compositions may be used in the following: the feedwater of boilers such as wayside boilers; for use in non-frothing emulsions used in leather tanning, the textile industry, etc.; in cutting oils; for incorporation into dye baths, dye pastes, discharge pastes and the like; to prevent foaming and resultant loss of liquid from a recirculating cooling system, in fermentation processes; in cooking with fats and oils; in lubricants; and in single or multiple effect concentrators containing aqueous, organic or inorganic type materials and the like.

Besides use in the above varied processes involving a wide scope of environmental conditions, the compositions of the invention are also active in controlling foaming of latex emulsions used for paints or coatings and in inhibiting and controlling foam in pulp and paper manufacture such as in a kraft process. The compositions have found particular use in inhibiting foam normally occurring during preparation and concentration of rubber latexes via rubber latex emulsion polymerization of such monomers as styrene, acrylonitrile, butadiene, isobutylene, isoprene, chloroprene and mixtures of any of the above. Soaps and surfactants used in the polymerization step cause severe foaming difficulties in absence of use of the defoaming and antifoam additives of the invention. Paper coatings such as butyl latex or polyvinyl chloride latex may likewise be treated during their production with the instant antifoamers.

When used to control and inhibit foam in industrial areas, addition of as little as 1 p.p.m. of the compositions of the invention gives good foam inhibition and foam prevention. As much as 50 p.p.m. of antifoam may be used with a preferred range being between 1 and 100 p.p.m., and with the most preferred range being 1–25 p.p.m.

The compounds of the invention are effective antifoamers over a wide range of pH conditions and when under almost any combination of pressure and temperature conditions. The compositions when used as antifoam agents should preferably be added as close as possible to the source of the foam. For example, to inhibit foam created under conditions of distilling off unreacted monomer and/or solvents used during production of aqueous latex emulsions, such as the type used in the paint and coating industries, the antifoam composition should be added directly to the reaction mass being processed, whereby it is actually present during the concentration step. Likewise, in a papermaking operation, since foaming difficulties occur in deckers, in equipment used to separate black or red liquor from paper pulp, in the screen boxes and the cylinders of a cylindrical papermaking machine, the headbox of a Fourdrinier papermaking machine, etc., it is preferred that antifoam application be made where the foam is actually present. The antifoam compounds of the invention may also be added to the feed box or to the screen pump, screens, or showers of the cylinder machine, or to the fan pump, showers or wire pit of the Fourdrinier machine. When used for antifoam control in pulp and paper manufacture, as little as 0.1 lb. of active antifoam per ton of pulp based on the weight of the dry fiber gives good results. As high as 20 lbs./ton may be used in extremely difficult foaming areas. In a preferred practice, between 0.2 and 2 pounds of chemical are used per ton of fiber stock.

The compositions of the invention may be used for a variety of use applications other than to inhibit foam formation. As just one example, it has been determined that the compounds are useful in preventing rosin pitch deposition upon papermaking equipment.

*Evaluation of the invention*

In order to determine the effectiveness of the antifoam compositions of the invention, a laboratory procedure was devised to simulate industrial conditions and test the efficiency of the cyclic siloxane products of the invention.

The following test was set up in order to determine the antifoam activity of the compositions of the invention with respect to paper pulp stock. A test stock was first prepared as follows: to 860 ml. of water containing 224 mg. of calcium chloride, were added 140 grams of 16% total solids black liquor and 50 ml. of a 1% aqueous solution of a sodium salt of a rosin acid. 58 ml. of this solution were then added to a 1 gallon jug. 18 grams of kraft pulp were pulped in 1,000 ml. of water and added to the jug containing the black liquor mixture. Stock was then made up to 1 gallon with tap water, well shaken and employed for the following test. In this test, 6 liters of the above paper stock containing pulp were placed in a glass pipe, 6" in diameter and 18" in height. The stock was recirculated through a 1½" diameter hose by means of a pump which was running at 3,450 r.p.m. The amount of antifoam necessary to prevent foam build-up during the recirculation was then determined.

The composition of Example I was then tested for antifoam activity in the above discussed recirculation test. This product had excellent activity in preventing and inhibiting foam build-up and in deaerating the paper stock within the aforementioned limits of chemical application per ton of paper stock. Specifically, after both 15 and 30 seconds time, foam height of only about 1 cm. was noted upon application of 1 p.p.m. of the composition of Example I to the glass pipe containing rapidly agitated paper stock. On the other hand, in a blank run involving no antifoam the foam spilled over the top of the pipe before the 15 second period elapsed.

Products of the invention prepared using polyethyl silicates and tetrafluoroethylene telomer reactants other than the specific reactants shown in Example I were also tested by the above scheme and gave equally good results.

In a field run, excellent foam control was achieved by addition of the product of Example I. This product was fed into a second stage repulper used to process southern pine run at approximately 140 tons per day. The temperature of the vats was approximately 180° F., and 250 gallons per minute of hot water was employed in this paper process step. The foaming problem created under conditions thus described in processing this particular pulp, was particularly severe. However, the tested composition of the invention was able to reduce the foam to almost a non-existent state at an additive rate of 25 cc. per minute or about 0.6 pound per ton of pulp. Moreover, the product due to its excellent spreading activity over the aqueous surface was able to almost immediately abate the foam. Deaeration was also effected almost instantaneously. The hydrophobic antifoam particles were able to interrupt the hydrophilic foaming film and thereby cause discontinuity and resultant immediate foam breakdown through release of air.

The invention is hereby claimed as follows:

1. A new composition of matter useful in defoaming and inhibiting foam formation which comprises the reaction product of a tetrafluoroethylene telomer having an average molecular weight of at least approximately 500 and a polyethyl silicate, said reaction taking place at a temperature of from 100–300° C., for a period of from about 2 to about 20 hours.

2. The composition of claim 1 wherein said tetrafluoroethylene telomer has an average molecular weight range of 1,000–10,000, and said polyethyl silicate contains at least 35% by weight of available silica expressed as $SiO_2$.

3. The composition of claim 2 wherein said reaction product is produced by reaction of 1–20 parts by weight of said polyethyl silicate and 1 part by weight of said tetrafluoroethylene telomer.

4. The composition of claim 3 wherein said polyethyl silicate has at least 1% of its molecular weight composed of free reactive hydroxyl groups, and said tetrafluoroethylene telomer reactant is dispersed in a halogenated hydrocarbon solvent in an amount of 1–30% by weight of solids.

References Cited
UNITED STATES PATENTS

| | | | |
|---|---|---|---|
| 3,024,194 | 3/1962 | Francis et al. | 252—321 |
| 3,038,000 | 6/1962 | Schmidt | 252—321 |
| 3,207,698 | 9/1965 | Siebling et al. | 252—321 |
| 3,225,018 | 12/1965 | Zutty | 260—448.8 |
| 3,267,042 | 8/1966 | Domba | 260—448.8 |

TOBIAS E. LEVOW, *Primary Examiner.*

P. F. SHAVER, *Assistant Examiner.*